United States Patent
Hagen (10) Patent No.: US 6,767,025 B2
(45) Date of Patent: Jul. 27, 2004

(54) FOLDING TRAILER FOR OFF-GROUND STORAGE ON A TOWING VEHICLE

(76) Inventor: Earnest G. Hagen, 4247 H.D. Atha Rd., Covington, GA (US) 30014

( * ) Notice: Subject to any disclaimer, the term of this patent is extended or adjusted under 35 U.S.C. 154(b) by 46 days.

(21) Appl. No.: 10/217,968

(22) Filed: Aug. 13, 2002

(65) Prior Publication Data

US 2004/0032114 A1 Feb. 19, 2004

(51) Int. Cl.$^7$ ............................................... B62D 63/00
(52) U.S. Cl. ........................ 280/401; 280/656; 414/482
(58) Field of Search ................................ 280/656, 401, 280/493, 491.5, 639, 43.1, 47.131; 414/480, 481, 482, 483, 485

(56) References Cited

U.S. PATENT DOCUMENTS

| | | | | |
|---|---|---|---|---|
| 3,989,264 A | * | 11/1976 | Lovendahl | 280/401 |
| 4,049,143 A | * | 9/1977 | Hatakka et al. | 414/458 |
| 4,362,316 A | * | 12/1982 | Wright | 280/656 |
| 4,490,089 A | * | 12/1984 | Welker | 414/483 |
| 4,685,855 A | * | 8/1987 | Celli | 414/482 |
| 5,224,728 A | * | 7/1993 | Ball | 280/476.1 |
| D344,834 S | * | 3/1994 | Ries | D34/28 |
| 5,474,416 A | * | 12/1995 | Rogge et al. | 414/482 |
| 6,113,130 A | * | 9/2000 | Saulce | 280/656 |
| 6,154,117 A | * | 11/2000 | Sato et al. | 337/365 |

* cited by examiner

Primary Examiner—Kelly E Campbell
(74) Attorney, Agent, or Firm—Harry I. Leon; Vivian L. Steadman (57) ABSTRACT

A two-wheeled trailer which can transported, when empty, in a folded position with its wheels off of the ground. Particularly useful for hunters who want to get into the back country without having to pull a trailer, it can be rapidly deployed when needed to haul game. The folding trailer is also handy for do-it-yourselfers who want to move lumber, plants, fertilizer, and the like. The trailer includes a rectangular frame which is mounted on a pair of wheels and a "T"-shaped member. Hinged to a transverse cross brace which generally bisects the rectangular frame are two arms. Disposed perpendicularly to the transverse cross brace, the arms terminate forwardly proximate with the distal ends of the "T"-shaped member to which they are pivotally connected. When the trailer is unfolded, the leg of the "T"-shaped member extends in front of the wheeled frame so as to define a tongue. The tongue can be secured by a trailer hitch to a hitch arm pinned to a hitch receiver mounted on the towing vehicle. When the trailer is folded, on the other hand, the tongue extends generally perpendicularly to the wheeled frame and can be inserted directly into the hitch receiver; held therewithin by a pin, the two wheels ride free of the ground. In an alternate embodiment, the two forward corners of the frame are truncated, giving its front end a beveled appearance.

4 Claims, 8 Drawing Sheets

FOLDING TRAILER FOR OFF-GROUND STORAGE ON A TOWING VEHICLE

BACKGROUND OF THE INVENTION

Trailers are widely used for the occasional hauling of building materials, plant supplies, camping equipment, or the like. However, what to do with a trailer when it is not needed has been a long-standing problem.

Some trailer owners find dragging a trailer particularly troublesome. Hunters, for example, are concerned about the extra noise and disturbance which towing an empty trailer into the back country may create but find the trailer extremely useful later on when they need to transport a large game animal carcass.

SUMMARY OF THE INVENTION

The object of this invention is to provide a trailer which can be folded and stored on the towing vehicle in an off-ground position and then deployed quickly when needed.

A further object is to provide such a trailer which can be stored within a minimal amount of space.

In accordance with the present invention, an improved trailer comprises a two-wheeled frame, a folding mechanism connected thereto, and a "T"-shaped hitch member terminating in a tongue. Included in the folding mechanism is a pair of arms whose distal ends are pivotally connected to the frame and to the "T"-shaped member, respectively. The arms are used to move the "T"-shaped member from a first position contiguous with the front of the frame to a second position contiguous with the rear of the frame and vice versa. The wheels are mounted on the frame in such a way that they are disposed generally downwardly and forwardly of the rear of the frame when the "T"-shaped member is in the first position. Moreover, the pivotal connections between the arms and the "T"-shaped member allow one to adjust the angular orientation of the tongue relative to the frame.

For towing, the tongue is extended in a forward direction generally parallel to the frame, with the "T"-shaped member being held in the first position. Prior to storage, on the other hand, the "T"-shaped member is moved into the second position and then rotated about the arms until the tongue is disposed perpendicularly to the frame. With such a folding mechanism, one can store the trailer wheels out of contact with the ground at the same time the trailer is attached, by its tongue, to a hitch receiver on the towing vehicle.

DETAILED DESCRIPTION OF THE PREFERRED EMBODIMENT

Figure 1:
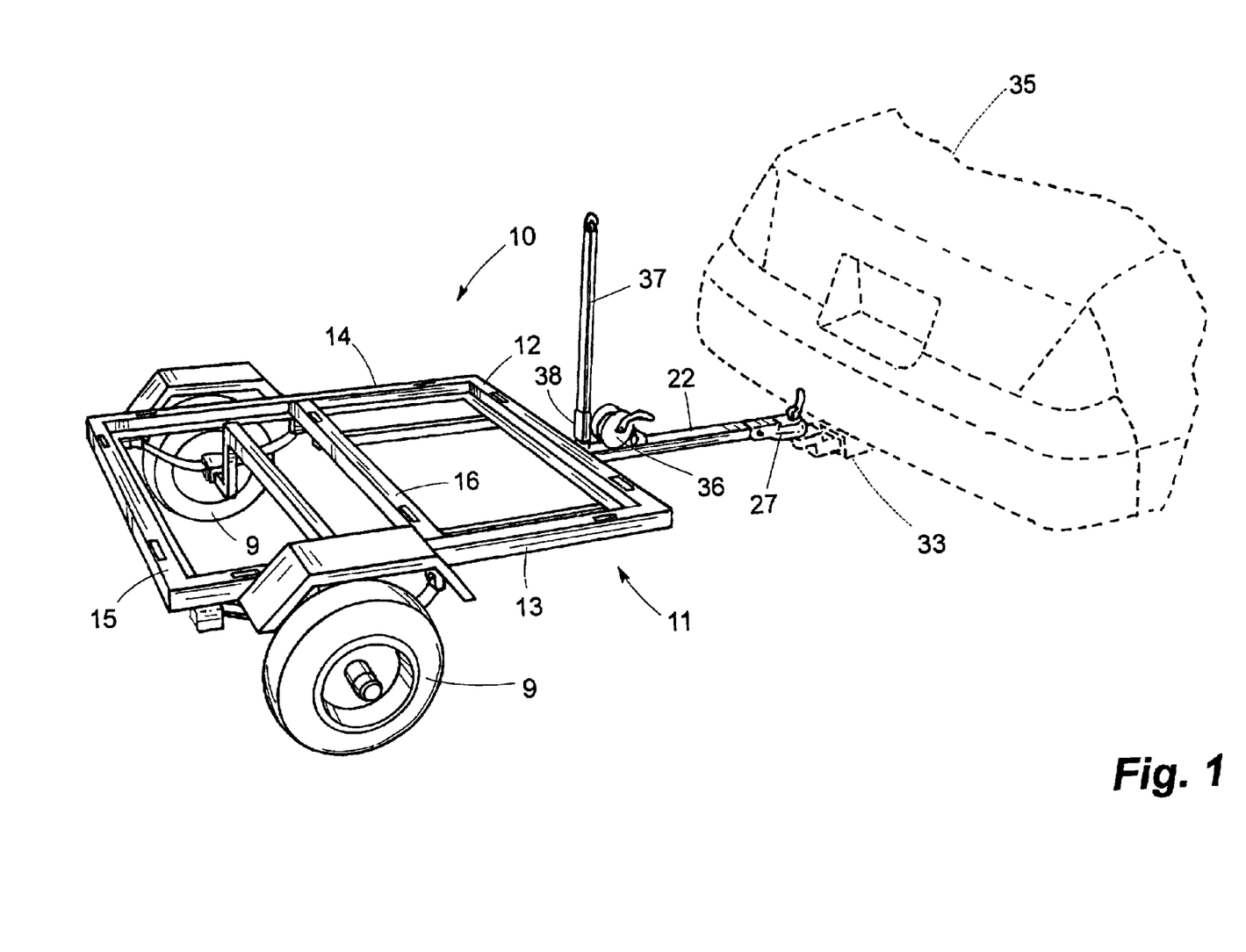
FIG. 1 is a right side perspective view of the trailer according to the present invention, the trailer being shown in its unfolded position attached by a trailer coupler to a road vehicle for towing purposes, the road vehicle being illustrated by dashed lines and forming no part of the invention.

In the drawings, a folding trailer for use with road vehicles is indicated generally by the reference numeral 10. As illustrated in FIGS. 1 through 8, the trailer 10 includes a platform support frame 11, a "T"-shaped hitch member 20, and a mechanism for rotating the hitch member about the mid-section of the support frame so as to fold the trailer. Wheels 9 mounted on the frame 11 are disposed beneath the trailer 10 when it is being towed (FIG. 1). The unique manner in which the trailer 10 folds allows it to be attached to a towing vehicle 35 at the same time the wheels 9 are out of contact with the ground (FIG. 3). This feature allows a person to drive with substantially greater freedom than would be the case were he towing the trailer 10 while it was in contact with the ground.

In the preferred embodiment, the trailer 10 has a generally rectangular frame 11. Front, side and rear frame members 12, 13, 14, 15 and a transverse cross brace 16 are preferably fabricated from open square tubing. Alternately, closed square tubing, as well as both open and closed round tubing, can be utilized.

Figure 2:
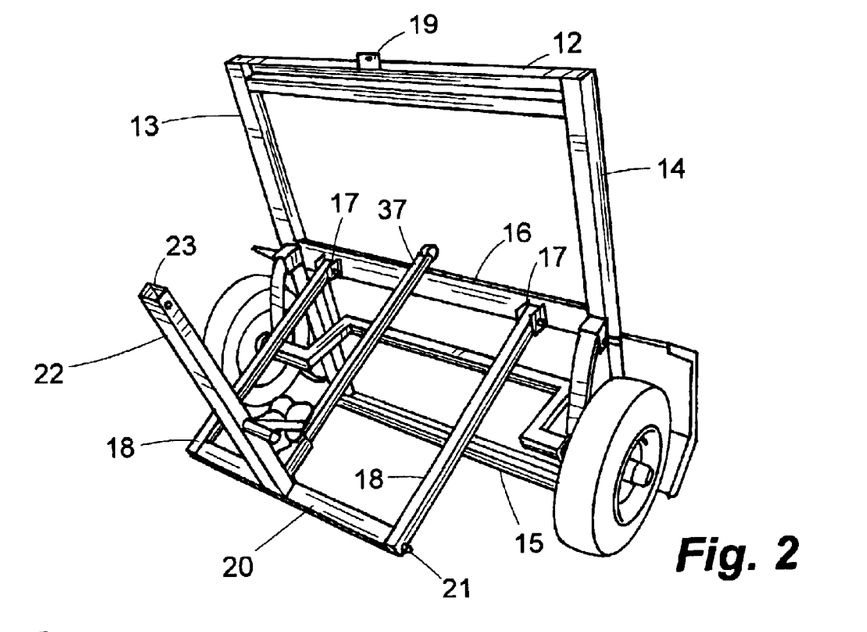
FIG. 2 is a right side perspective view of the trailer according to FIG. 1, the trailer being shown in a partly folded position, with the trailer coupler removed for clarity of illustration.
Figure 3:
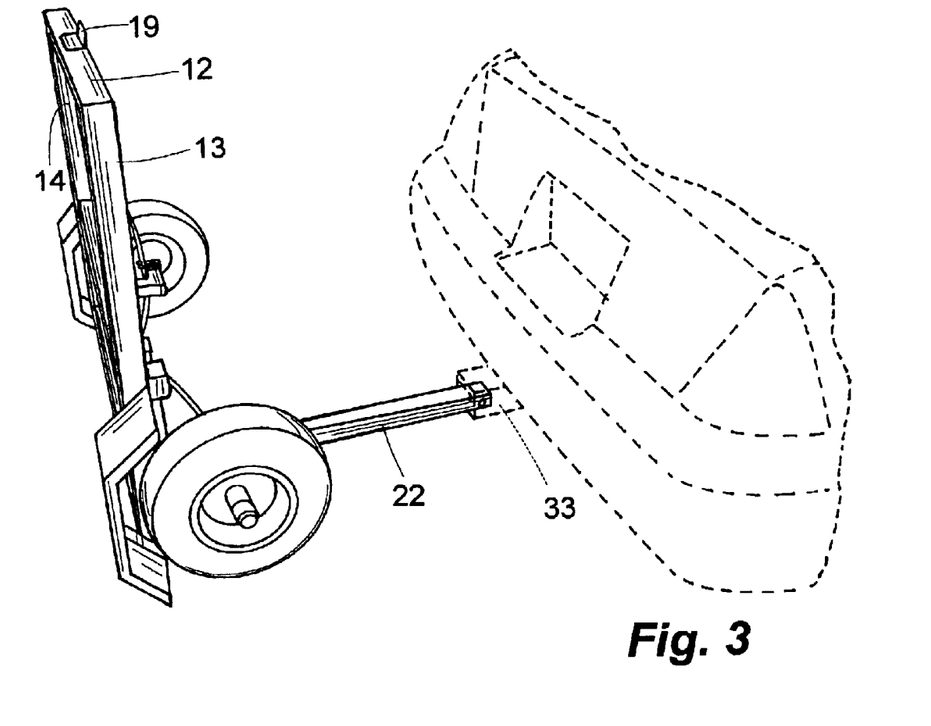
FIG. 3 is a right side perspective view of the trailer according to FIG. 2, the trailer being shown in its folded position attached to the towing vehicle.

Disposed midway between the front and rear frame members 12, 15 and situated generally parallel thereto, the transverse cross brace 16 is rigidly attached by its distal ends to the side frame members 13, 14, strengthening the frame 11 (FIGS. 1, 2, 4, 5). At least one pair of hinge brackets 17 are affixed to the underside of the cross brace 16 (FIG. 2). Pivotally connected to each hinge bracket 17 is an arm 18, one end thereof defining a hole which is sized for slideably receiving a hinge pin within the contiguous hinge bracket.

Figure 6:
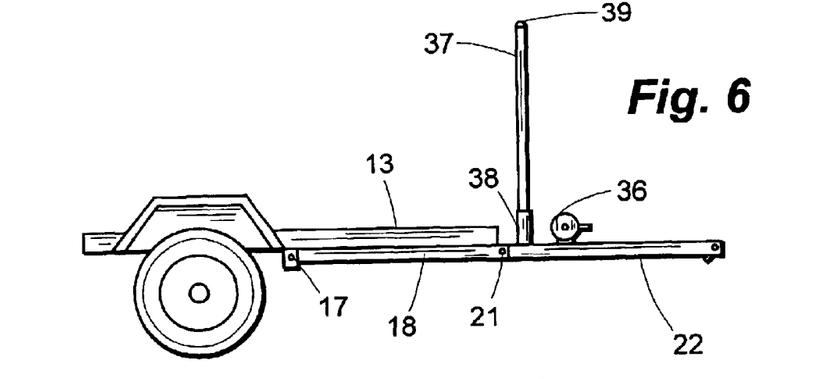
Figure 7:
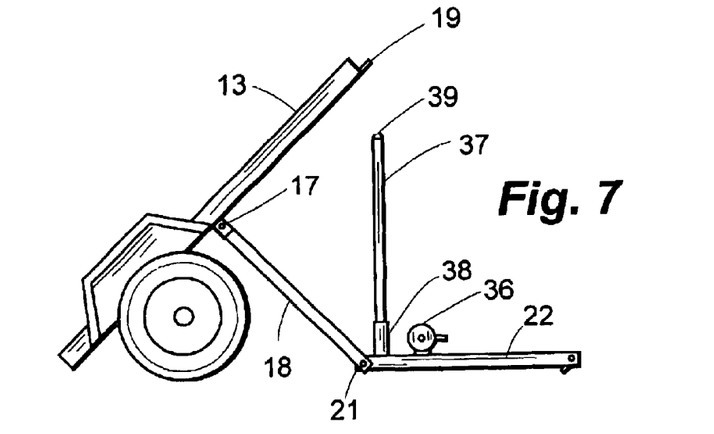
FIGS. 7 and 8 are side elevational views of the trailer according to FIG. 2, the trailer being shown in its partly folded and folded positions, respectively.
Figure 8:
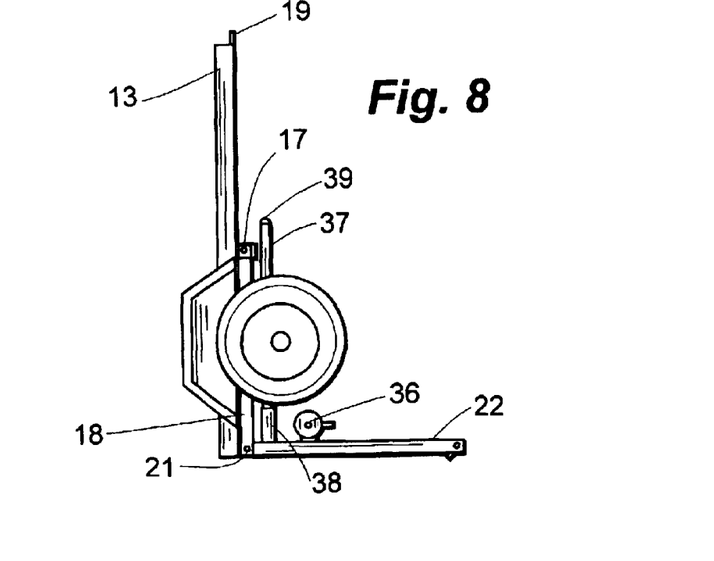

As illustrated in FIGS. 6 through 8, the arms 18 are simultaneously rotatable through approximately 180 degrees about the cross brace 16. To position the trailer 10 for towing, one must move the arms 18 forward, so that they are aligned generally parallel to the side frame members 13, 14 (FIG. 6). Moving the arms 18 aft, on the other hand, is a prerequisite for folding the trailer 10 (FIG. 8).

In addition to the arms 18 being rotatable about the mid-section of the frame 11, the "T"-shaped hitch member 20 is pivotally connected to these arms (FIGS. 2, 6–8). Hinge pins 21, which protrude laterally from the "T"-shaped hitch member 20 and are slip fitted into holes formed in the ends of the arms 18 distal from the hinge brackets 17, allow one to rotate the "T"-shaped hitch member 20 through at least 90 degrees relative to the longitudinal centerlines of the arms.

Figure 4:
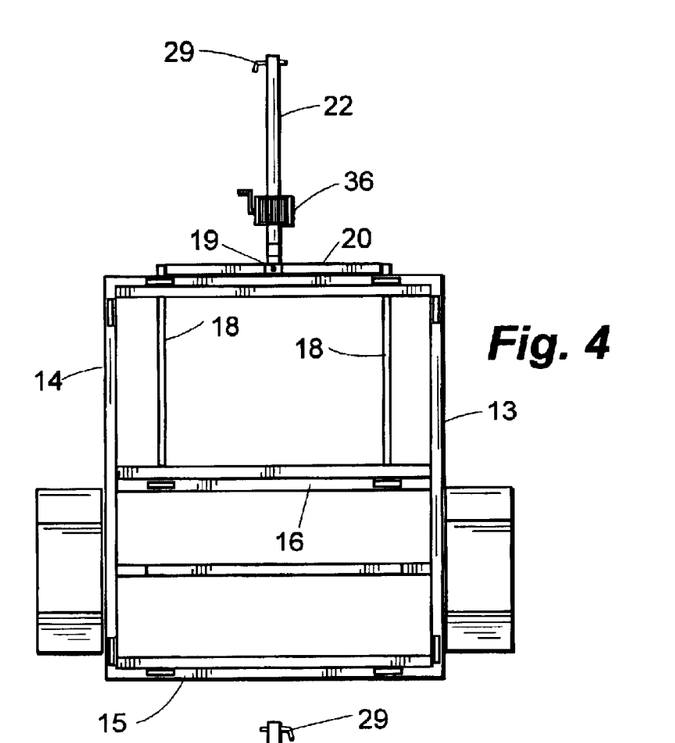
FIGS. 4, 5 and 6 are top plan, bottom plan and side elevational views of the trailer according to FIG. 2, in its unfolded position.
Figure 5:
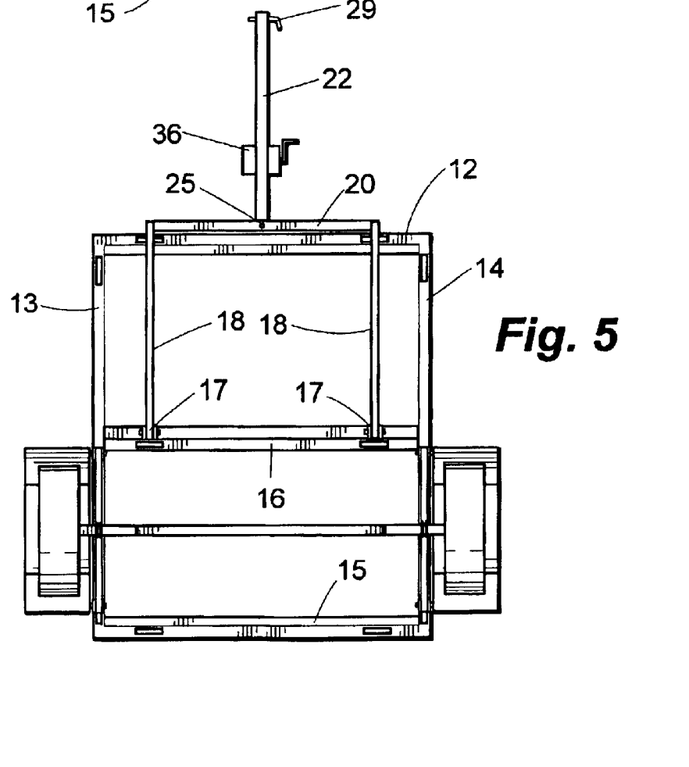

Means for temporarily locking the "T"-shaped hitch member 20 against the frame 11 includes a flange 19 extending forwardly from the front frame member 12, a hole 25 formed in the "T"-shaped hitch member, and a pin (not shown) for engaging the hole 25, as well as a hole in the flange 19 alignable therewith, when the arms are held in contact with the front frame member 12 (FIGS. 4 and 5).

Similarly, a temporary locking mechanism for securing the "T"-shaped hitch member 20 against the frame 11, when the hitch member is in contact with the rear frame member 15, includes at least one "C"-clamp (not shown). Other suitable fasteners for so securing the "T"-shaped hitch member 20 include hitch pins which can keep it from rotating about the hinge pins 21 once the necessary angular orientation of the leg 22 relative to side frame members 13, 14 has been realized.

When the arms 18 have been moved into the aft position and the hitch member 20 has been rotated so that a tongue 22 thereon is disposed approximately perpendicularly to the side frame members 13, 14, the trailer 10 is in its folded position, ready to be secured with a clamp (not shown) or other temporary locking mechanism for storage.

Figure 10B:
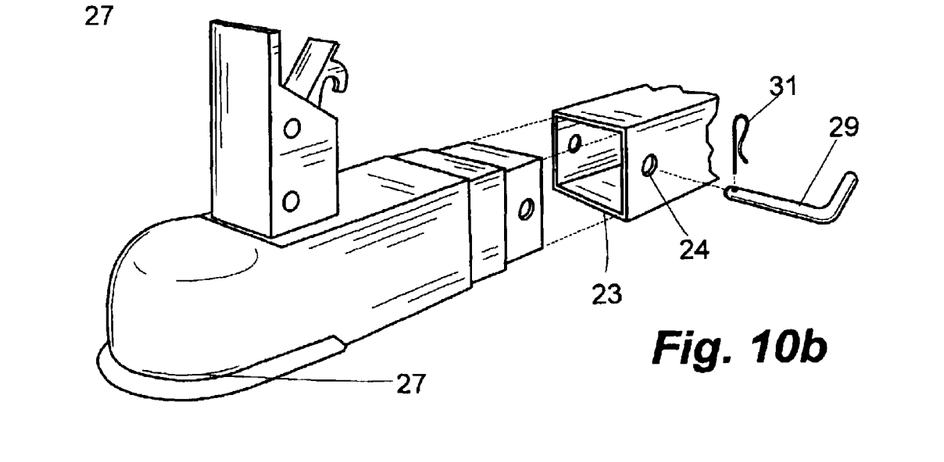
FIG. 10b is an exploded view of the tongue and a fragmentary portion of the tongue in the trailer according to FIG. 1.
Figure 11:
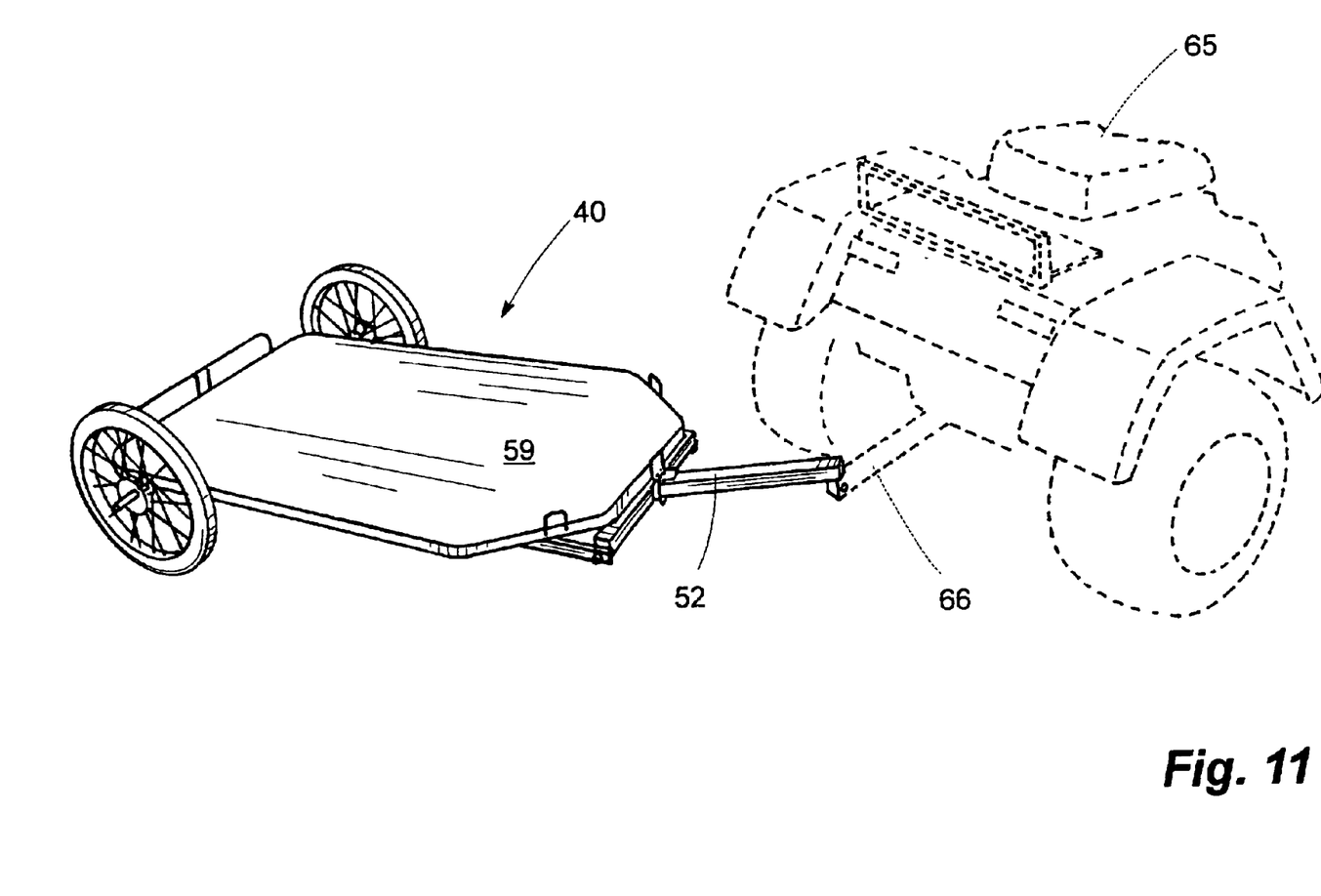
FIG. 11 is a right side perspective view of an alternate embodiment of the trailer according to FIG. 1, the trailer being shown in its unfolded position attached to an off-the-road vehicle for towing purposes, the off-the-road road vehicle being illustrated by dashed lines and forming no part of the invention.

Once the trailer 10 is in its folded position, it can be stored on either the ground or the floor. Alternately, the trailer 10 can be stored, with its wheels 9 off of the ground, on the towing vehicle 35. In the latter configuration, the end 23 of the tongue 22 is inserted into and pinned within a hitch receiver 33 mounted on the vehicle (FIG. 3). In the case of a type II or III hitch receiver 33, for example, the tongue 22, which is preferably fabricated of two inch square tubing, is held in place in the hitch receiver with the use of a standard hitch pin 29. When inserted into a hole in the hitch receiver 33 and a hole 24 formed in the end 23 which is alignable therewith, the hitch pin 29, secured by a locking pin 31, holds the tongue 22 and the hitch receiver in assembled relation (FIG. 10b).

In the preferred embodiment, when the trailer 10 has been folded and its tongue 22 has been attached securely to the hitch receiver 33, the wheels 9 are each about one foot off of the ground (FIG. 3). Alternately, the trailer 10 can be stored in its folded position, resting on the rear frame member 15 and the leg 22 of the "T"-shaped hitch member 20 (FIG. 8).

Figures 9, 10A:
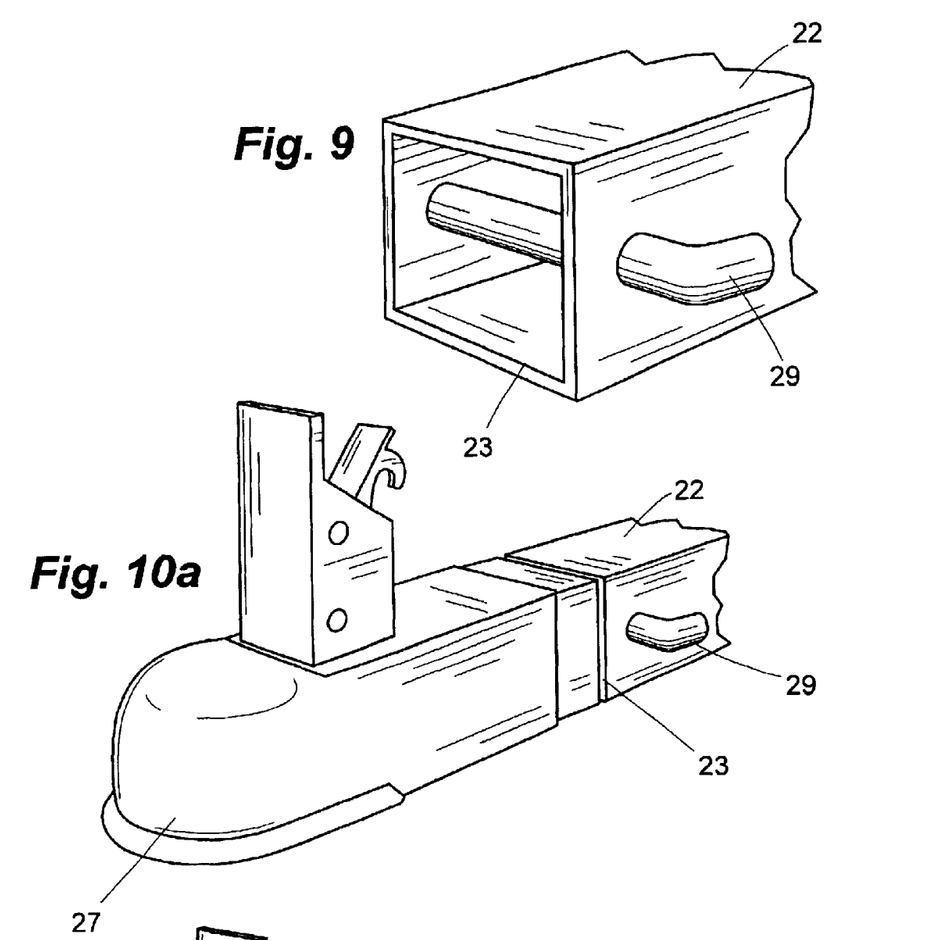
FIG. 9 is a closeup view, on an enlarged scale, of a fragmentary portion of the tongue of the "T"-shaped hitch member in the trailer according to FIG. 1.
FIG. 10a is a closeup view of the trailer coupler and a fragmentary portion of the tongue in the trailer according to FIG. 1, the trailer coupler being mounted on the tongue.

The trailer 10 is readied for towing first by rotating the arms 18 into the forward position and then temporarily fastening them to the front frame member 12. Second, the "T"-shaped hitch member 20 is rotated forward and also fastened to the front frame member 12. Next, the end 23 on the tongue 22 is temporarily fitted with a trailer coupler 27 (FIGS. 10a and 10b). Finally, the trailer coupler 27 is attached to a hitch ball (not shown) or the like on the towing vehicle 35 (FIG. 1).

In the preferred embodiment, a small wench 36 is secured to the tongue 22 in front of the frame 11 to help move the trailer 10 into position. Used in conjunction with the wench 36 to pull the trailer 10 forwardly and hitch it to the vehicle 35 is a removable cable boon 37, which is slideably insertable within a receptor 38 mounted perpendicularly to the tongue 22 on the "T"-shaped hitch member 20. In use, a wench cable (not shown), which is fed from the wench 36 onto a pulley 39 atop the boon 37 and hooked onto the frame of the vehicle 35, pulls the trailer 10 forward. By utilizing the pulley 39 to increase his effective pulling force, a single person can easily attach the trailer 10 to the towing vehicle 35.

The frame 11 can support trailer beds fabricated from a wide variety of materials including plywood, sheet or expanded metal, certain plastics, and the like. A prototype of the trailer 10 includes a platform support frame 11 which is fabricated of two inch square tubing and measures, "by way of example, 40 inches wide by 48 inches long, and arms 18 which extend forwardly of a transverse cross brace 16 about 20 inches. Supporting this frame 11 are wheels 9 which use 4.00×8 tires.

Figure 12:
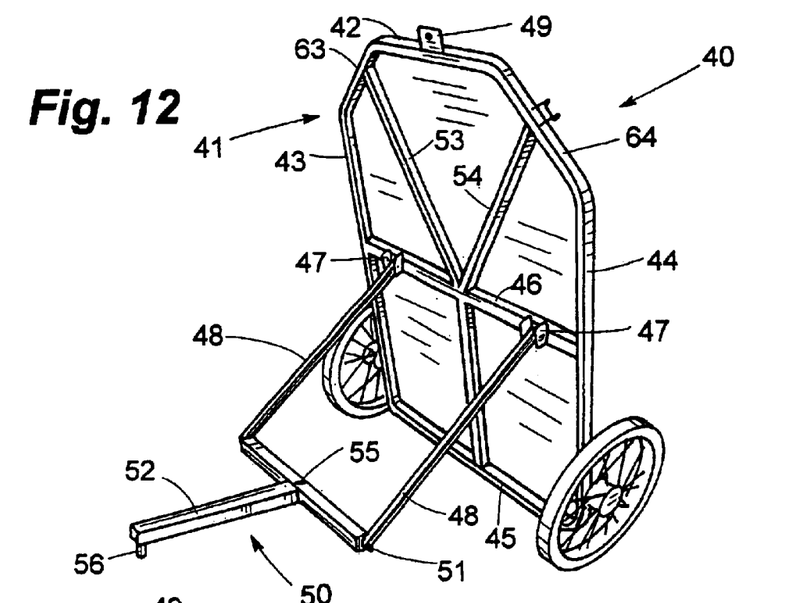
FIG. 12 is a right side perspective view of the trailer according to FIG. 11, the trailer being shown in a partly folded position.

Illustrated in FIGS. 11 through 16 is an alternate embodiment indicated generally by the reference numeral 40. Trailer 40, which is intended for off-the-road use, includes a frame 41, for supporting a platform 59. Divided front to back by a transverse cross brace 46, the frame 41, which is of generally lighter construction than that of the frame 11, includes a front frame member 42, side frame members 43, 44 and rear frame member 45. Stiffening the frame 11 are two branches 53, 54 which are rigidly attached to the transverse cross brace 46 and diverge forwardly from their juncture therewith. As illustrated in FIG. 12, the branches 53, 54 distal from the transverse cross brace 46 are permanently joined to diagonal frame members 63, 64, linking the front frame member 42 and the side frame members 43, 44, respectively.

Figure 14:
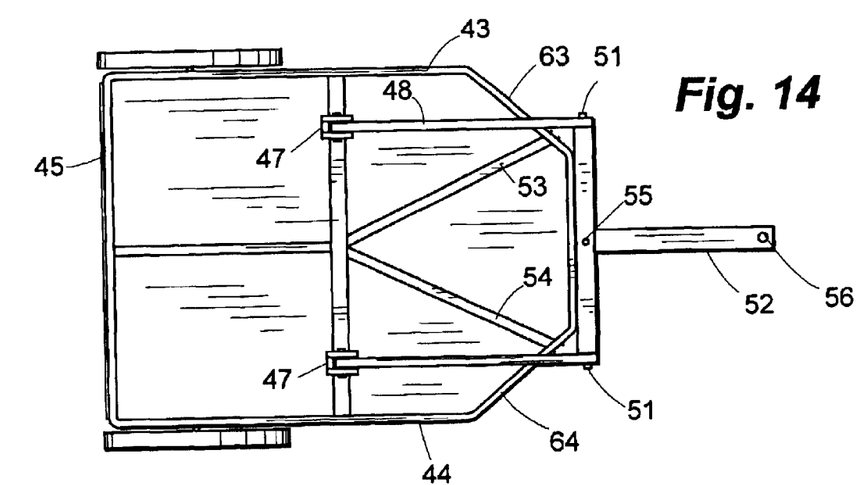
FIGS. 14 and 15 are top plan and side elevational views of the trailer according to FIG. 11, in its unfolded position.

Rigidly mounted on the underside of the transverse cross brace 46 are at least two hinge brackets 47 to which are pivotally attached a pair of arms 48 (FIGS. 12 and 14). One end of each arm 48 defines a hole which is sized for slideably receiving a hinge pin within the contiguous hinge bracket.

Figure 16:
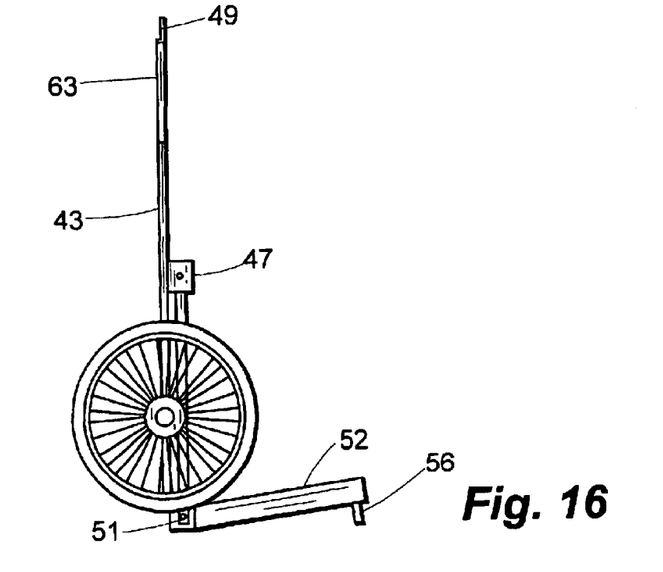
FIG. 16 is a side elevational view of the trailer according to FIG. 11, in its folded position.

Protruding from distal ends of a "T"-shaped hitch member 50 are pins 51 (FIGS. 12, 14, 16). The pins 51 are slip fitted into holes formed in the ends of the arms 48 distal from the hinge brackets 47, allowing one to rotate the "T"-shaped hitch member 50 through at least 90 degrees relative to the longitudinal centerlines of the arms.

Figure 15:
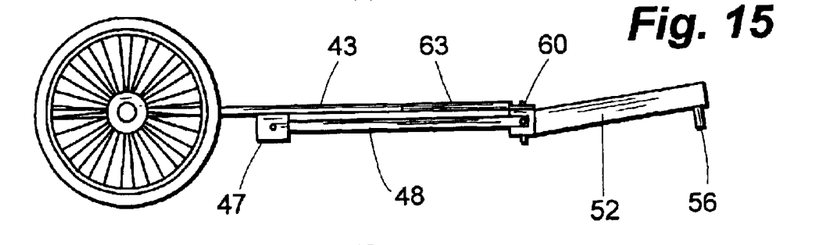

Means for temporarily locking the "T"-shaped hitch member 50 against the frame 41 includes a flange 49, a hole 55 formed in the "T"-shaped hitch member 50, and a pin 60 for engaging the hole 55, as well as a hole are the flange 49 alignable therewith, when the arms are held in contact with the front frame member 42 (FIGS. 14 and 15).

Means for temporarily locking the "T"-shaped hitch member 50 against the frame 41 includes a flange 49, a hole 55 formed in the "T"-shaped hitch member 50, and a pin 60 for engaging the hole 55, as well as a hole are the flange 49 alignable therewith, when the arms are held in contact with the front frame member 42 (FIGS. 14 and 15).

Once the tongue 52 has been extended forwardly and secured in place by said locking means, a hitching knob 56 on the front end of the tongue can be slideably inserted into a hole (not shown) defined by a hitch receiver 66 on an off-the-road towing vehicle 65 (FIGS. 11, 12, 14–16). The trailer 40 is then ready to be towed.

Figure 13:
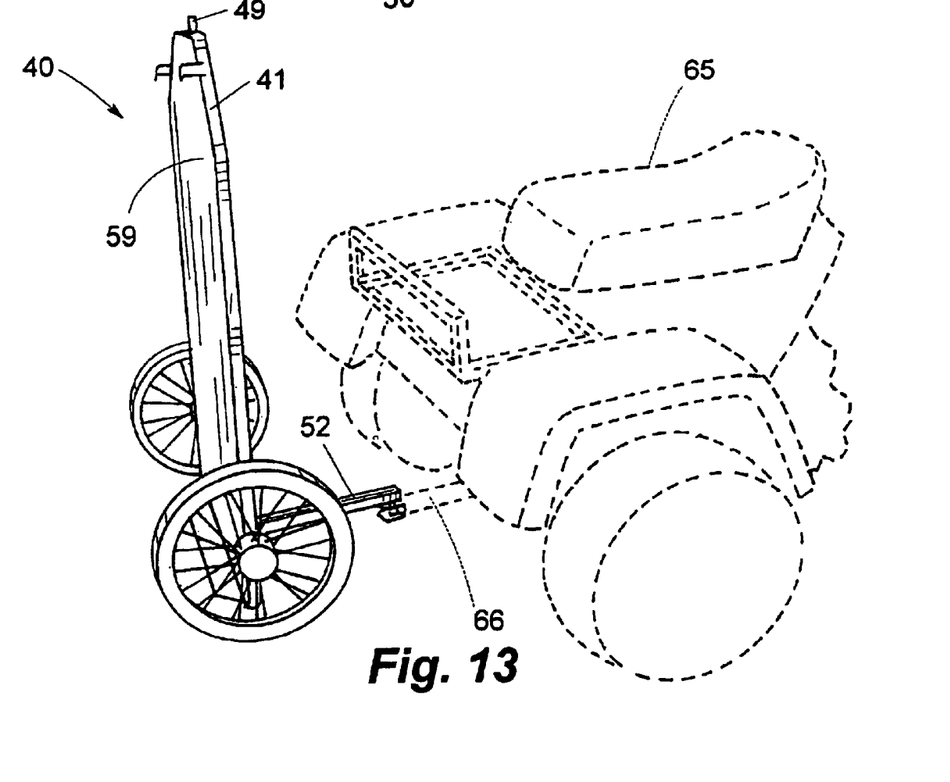
FIG. 13 is a right side perspective view of the trailer according to FIG. 11, the trailer being shown in its folded position attached to the towing vehicle.

Stored in its folded position, the trailer 40 rests on the rear frame member 45 and a leg 52 of the "T"-shaped hitch member 50 (FIG. 16). Alternately, the trailer 40 can be transported in a folded position secured to the hitch receiver 66, with the trailer wheels off of the ground, provided the tongue 52 of the "T"-shaped hitch member 50 and the hitching knob 56 are secured held in place by the hitch receiver 66 (FIG. 13).

A prototype of the trailer 40 includes a platform support frame 41 which, except for the "T"-shaped hitch member 50, is fabricated of one inch square tubing and measures, by way of example, 48 inches long by 31 inches wide. The arms 48 extend forwardly of the transverse cross brace 46 about 20 inches. So that the tongue 52 has adequate structural strength, it is preferably made of two inch square tubing. Moreover, when the tongue 52 of the "T"-shaped hitch member is so sized, one can, once the hitching knob 66 is removed, slideably insert the end of the tongue into a standard type III vehicle hitch receiver 33 and transport the trailer 40 in a folded position secured thereto.

It is understood that those skilled in the art may conceive other applications, modifications and/or changes in the invention described above. Any such applications, modifications or changes which fall within the purview of the description are intended to be illustrative and not intended to be limitative. The scope of the invention is limited only by the scope of the claims appended hereto.

It is claimed:

1. A folding trailer, comprising:
   (a) a "T"-shaped hitch member having an elongated bar;
   (b) a frame having front and rear frame members which are spaced apart and disposed generally parallel to the elongated bar of the "T"-shaped hitch member;
   (c) at least one hinge attached to the frame;
   (d) means, including at least one arm whose distal ends are pivotally connected to the hinge and to the bar, respectively, for moving the elongated bar along an imaginary arc of approximately 180 degrees from a first position proximate with the front frame member to a second position proximate with the rear frame member;
   (e) a pair of wheels; and
   (f) means for mounting the wheels on the frame in such a way that the wheels are disposed generally downwardly and forwardly of the rear frame member when the bar is held in said first position, the pivotal connection between the hinge and the arm being situated under the frame when the wheels are so disposed.

2. A folding trailer; comprising:
   (a) a "T"-shaped hitch member having an elongated bar and a leg disposed perpendicularly thereto;
   (b) a frame having front and rear frame members which are spaced apart and disposed generally parallel to the elongated bar of the ±T"-shaped hitch member;
   (c) means, including at least one arm whose distal ends are pivotally connected to the frame and to the bar, respectively, for moving the elongated bar from a first position proximate with the front frame member to a second position proximate with the rear frame member;
   (d) a pair of wheels; and
   (e) means for mounting the wheels on the frame in such a way that the wheels are disposed generally downwardly and forwardly of the rear frame member when the bar is held in said first position, the "T"-shaped hitch member being rotate about its pivotal connections with the arm so as to position the leg generally perpendicularly to the frame when the elongated bar is being held in the second position, thereby folding the trailer in such a way that said wheels are disposed off of the ground.

3. A folding trailer adapted to be towed behind a vehicle on which is mounted a hitch receiver, which comprises:
   (a) a frame having a pair of longitudinally extending side members and a transverse cross brace, distal ends of the transverse cross brace being rigidly attached to the side members proximate with their respective mid-sections;
   (b) a pair of wheels which are mounted beneath the frame;
   (c) a "T"-shaped member and a pair of spaced apart arms, each arm being hinged to the transverse cross brace and disposed perpendicularly thereto, each arm distal from the transverse cross brace being pivotally connected to the "T"-shaped member the "T"-shaped member defining a centrally disposed leg; the leg, when the trailer is unfolded, extending in front of the frame so as to define a tongue; the "T"-shaped member, when the trailer is folded, being secured to the frame in such a way that the leg extends generally perpendicularly to the longitudinally extending side members, an end of the leg being insertable into the hitch receiver, so that the trailer, when folded, can be attached to the hitch receiver with said pair of wheels disposed off of the ground.

4. A folding trailer, which comprises:
   (a) a frame having a pair of longitudinally extending side members and a transverse cross brace, distal ends of the transverse cross brace being rigidly attached to the side members proximate with their respective mid-sections;
   (b) a pair of wheels which are mounted beneath the frame;
   (c) a "T"-shaped member and a pair of spaced apart arms, each arm being hinged to the transverse cross brace and disposed perpendicularly thereto, each arm distal from the transverse cross brace being pivotally connected to the "T"-shaped member, the "T"-shaped member defining a centrally disposed leg; the leg, when the trailer is unfolded, extending in front of the frame so as to define a tongue; the "T"-shaped member, when the trailer is folded, being secured to the frame in such a way that the leg extends generally perpendicularly to the longitudinally extending side members.

* * * * *